United States Patent [19]

Zamburro

[11] Patent Number: 4,601,822
[45] Date of Patent: Jul. 22, 1986

[54] WATER PURIFYING APPARATUS

[76] Inventor: Frank Zamburro, 31 Lenna Street, East Burwood, Victoria, Australia, 3151

[21] Appl. No.: 557,163
[22] PCT Filed: Feb. 17, 1982
[86] PCT No.: PCT/AU83/00022
  § 371 Date: Oct. 17, 1983
  § 102(e) Date: Oct. 17, 1983
[87] PCT Pub. No.: WO83/02937
  PCT Pub. Date: Sep. 1, 1983

[30] Foreign Application Priority Data

Feb. 17, 1982 [AU] Australia ............... PF2753

[51] Int. Cl.$^4$ .................................................. C02F 1/32
[52] U.S. Cl. ..................................... 210/192; 210/223
[58] Field of Search ............... 210/748, 764, 765, 192, 210/222, 223; 422/24; 250/527, 504

[56] References Cited

U.S. PATENT DOCUMENTS

| | | | |
|---|---|---|---|
| 3,079,498 | 2/1963 | Ruffin | 250/45 |
| 4,008,045 | 2/1977 | Free | 250/436 |
| 4,151,090 | 4/1979 | Fava | 210/222 |
| 4,179,616 | 12/1979 | Coviello et al. | 210/748 X |
| 4,267,455 | 5/1981 | Keller | 210/192 X |
| 4,273,660 | 6/1981 | Beitzel | 210/192 X |
| 4,278,549 | 7/1981 | Abrams et al. | 210/222 X |
| 4,296,066 | 10/1981 | Schenck | 210/765 X |

FOREIGN PATENT DOCUMENTS

| | | |
|---|---|---|
| 276566 | 6/1965 | Australia . |
| 417354 | 2/1969 | Australia . |
| 456160 | 12/1974 | Australia . |
| 469042 | 4/1975 | Australia . |
| 508837 | 11/1979 | Australia . |
| 8310882 | 11/1982 | Australia . |
| 1167578 | 10/1969 | United Kingdom . |

Primary Examiner—Thomas Wyse
Attorney, Agent, or Firm—Cushman, Darby & Cushman

[57] ABSTRACT

Water purifying apparatus comprises outer chamber (1) and inner chamber (4) located coaxially within outer chamber (1). Inner chamber (4) contains ultra violet light generator tube (13). Water enters inlet pipe (11) flowing several times over ultra violet light generator tube (13) by means of fins (8) which form channels (9), (9A), (10) and (10A) communicating with each other through space (6) at the bottom of chamber (1) and then through outlet (12). The water may be purified further by passing through a magnetic field formed by magnets (16) and (17) formed on either side of outlet (12).

8 Claims, 3 Drawing Figures

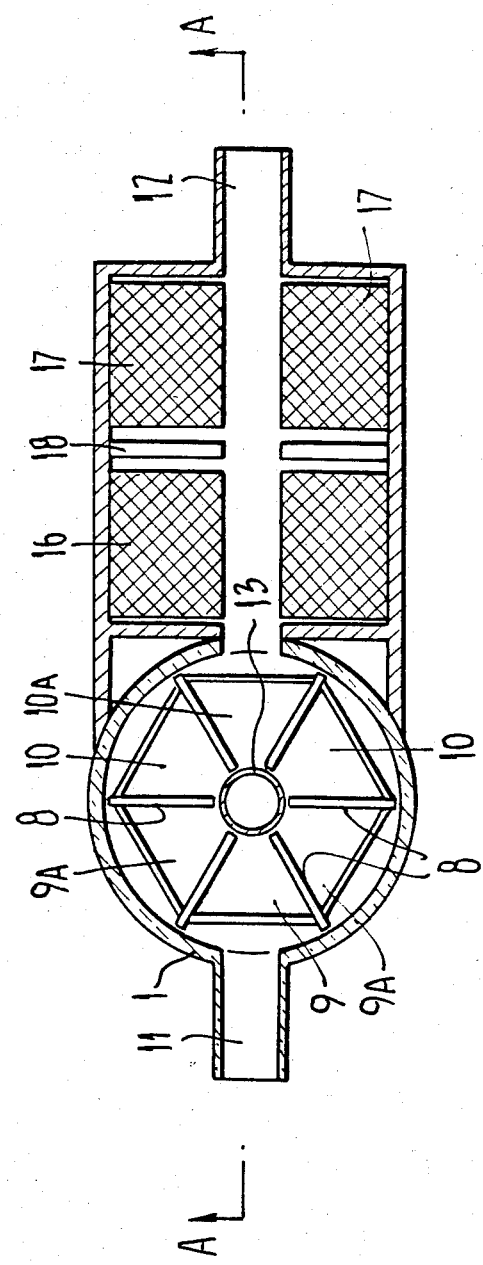

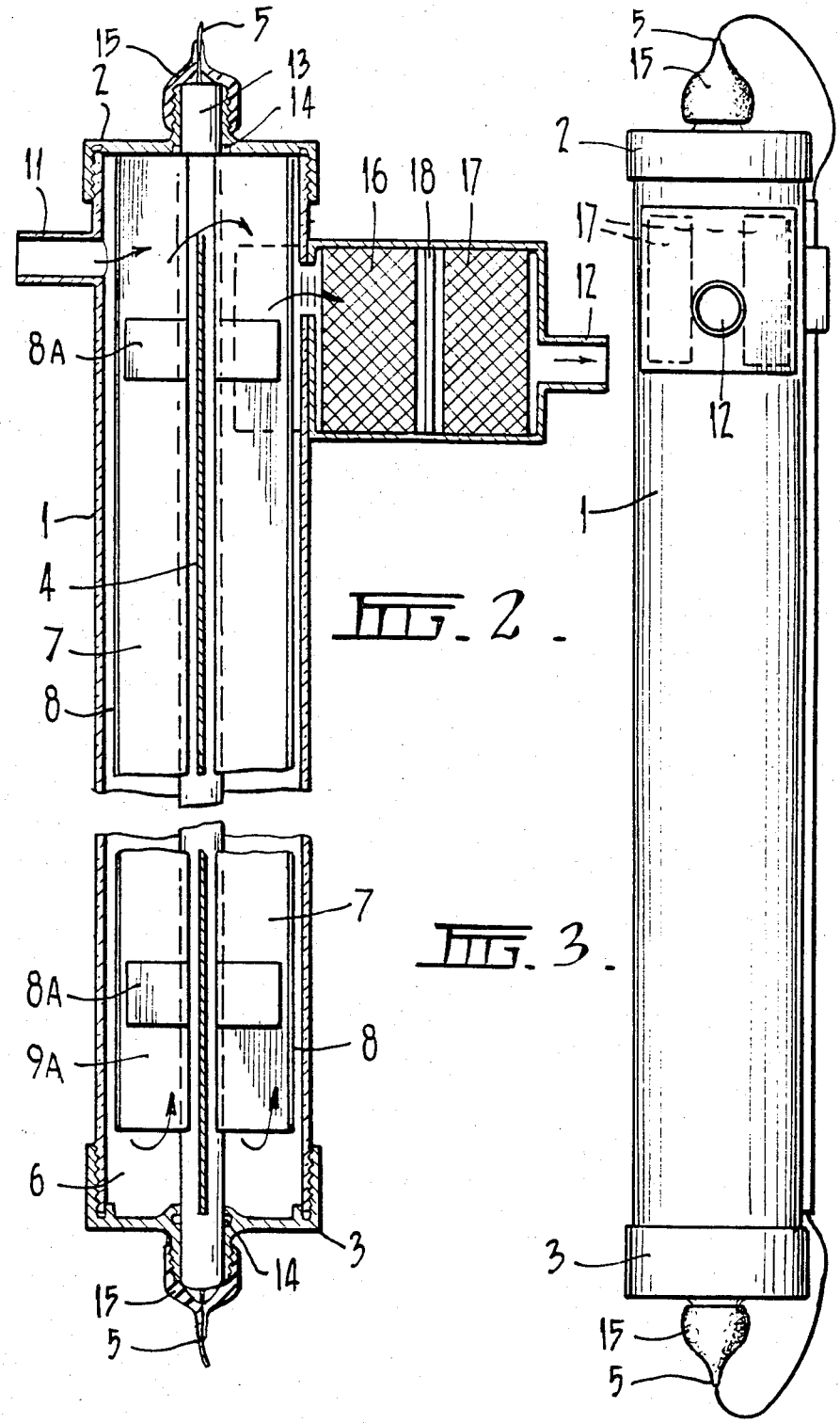

WATER PURIFYING APPARATUS

This invention relates to water purifying apparatus and has been devised particularly though not solely for purifying the water in a swimming pool.

It is a disadvantage of present swimming pool water purifying systems that they entail the use of chemicals which are expensive to purchase and which involve frequent dosing into the pool which is inconvenient and takes up a considerable amount of time both in the dosing and testing procedures. Furthermore swimming pools treated with chlorine or other similar chemicals are often unpleasant to swim in due to the presence of the chemicals in the water.

It is therefore an object of the present invention to provide a water purifying apparatus and a method of purifying pool water which will obviate or minimize the foregoing disadvantages in a simple yet effective manner or which will at least provide the public with a useful choice.

Accordingly in one aspect the invention consists in apparatus for purifying water comprising an outer chamber, an inner chamber located within the outer chamber and having at least a substantial portion of the walls thereof formed from a substantially transparent material, ultra-violet light generating means located within the inner chamber and means to direct the flow of water through said outer chamber and over said inner chamber.

In a further aspect the invention consists in a method of purifying pool water comprising the steps of directing a flow of water from the pool through a chamber and irradiating the water in the chamber with ultra-violet light.

Notwithstanding any other forms that may fall within its scope one preferred form of the invention will now be described by way of example only with reference to the accompanying drawings in which:

FIG. 1 is a horizontal cross-section of water purifying apparatus according to the invention, FIG. 2 is a vertical cross-section on the line A—A of FIG. 1, and FIG. 3 is an elevation of the water purifying apparatus viewed at right angles to FIG. 2.

In the preferred form of the invention water purifying apparatus which is particularly designed for purifying water used in swimming pools but which may of course be used in other water purifying applications is constructed as follows:

The apparatus comprises an outer chamber 1 which is a cylindrical tube connecting end flanges 2 and 3. The apparatus further comprises an inner chamber 4 which may be a transparent cylinder coaxially located within the outer chamber 1 but which is preferably the casing of an ultra-violet light generating tube having electrical terminals 5 at either end thereof. Where the inner chamber is a transparent cylinder the ultra-violet light generating tube is located within the cylinder. The annular space 7 between the inner and outer chambers is divided into a plurality of longitudinal channels by way of longitudinal fins 8 extending between the inner and outer chambers and forming longitudinal channels 9, 9A, 10 and 10A communicating with one another through the space 6 at the bottom of the chamber 1. The fins are supported and spaced as shown by fin spacers 8A into space 6, upwardly through channels 9A, downwardly through channels 10.

The apparatus is provided with an inlet pipe 11 into the outer chamber at the upper end adjacent the mounting flange 2 and an outlet pipe 12 located diametrically opposite the inlet pipe 11. In this manner water from a pool or other source may be pumped in through the inlet pipe 11 whereupon it is directed downwardly between the inner and outer chambers through channel 9 into space 6, upwardly through channels 9A, downwardly through channels 10 and upwardly through the channel 10A and outwardly through the outlet pipe 12.

The inner chamber is formed by the outer casing of an ultra-violet light generating tube 13 which extends from the end flange 2 to the end flange 3. The tube is mounted in rubber O-ring seals 14 and provided with suitable end caps and mounts 15 to provide electricity to the tube.

In the preferred form of the invention the inner surface of the outer chamber 1 is reflectorized for example by polishing, plating or by the provision of a reflectorized plastics coating so as to reflect ultra-violet light from the tube 13.

In use water from the pool, for example water passing to or from the filter, is diverted through the apparatus to enter through the inlet pipe 11 and exit from the outlet pipe 12 as previously described. The ultra-violet tube 13 which is ideally an ultra-violet germicidal ray tube is provided with electricity so that it generates ultra-violet rays which irradiate the water passing between the inner and outer chambers. In this manner the pool water is irradiated with ultra-violet rays to kill any bacteria or other germs in the water and so to purify the water.

It is a particular feature of the invention that the water passes four times over the length of the tube 13 to achieve maximum irradiation of the water from the ultra-violet light. The reflectorized inner surface of the outer chamber 1 also assists in achieving maximum saturation of the water by the ultra-violet rays.

The apparatus is also very simple and convenient to construct and service as the mounting flanges 2 and 3 are used to support all the components and enable the tube 13 and fins 8 to be conveniently withdrawn at any time for inspection or cleaning or replacement.

The water is further purified by the provision of matched pairs of permanent magnets 16 and 17 on either side of the outlet pipe 12. The magnets are preferably arranged so that the first pair 16 attract one another and the second pair 17 repel one another. The magnets are held in place in a suitable housing to create a magnetic field across the outlet pipe 12. The pairs of magnets may be separated by an isolation plate 18.

In this manner water purifying apparatus is provided which enables pool water to be simply and cheaply purified without requiring the use of chemicals or the time of an operator.

I claim:

1. Apparatus for purifying water, comprising an outer chamber, an inner chamber located within the outer chamber and having at least a substantial portion of the walls thereof formed from a substantially transparent material, an ultra-violet light generating tube located within the inner chamber and means to direct the flow of water through said outer chamber and over said inner chamber, said means to direct the flow of water including a plurality of longitudinal fins extending between said inner and outer chambers, said fins comprising substantially equispaced longitudinal baffles dividing the annulus between the inner and outer chambers into wedge shaped segments with the ultra-violet light generating tube disposed at the apex of each segment and wherein water flow is directed alternately up and down adjacent segments from the inlet to the outlet.

2. Apparatus as claimed in claim 1 wherein said inner chamber comprises the outer casing of said tube.

3. Apparatus as claimed in either claim 1 or claim 2 wherein said outer chamber comprises a cylinder and said inner chamber comprises a further cylinder smaller in diameter than said outer chamber and located substantially coaxially therein.

4. Apparatus as claimed in claim 1 wherein said outer chamber is provided with an inlet and an outlet both adjacent one end thereof and wherein said fins or baffles are arranged to direct the flow of water from said inlet to the opposite end of said outer chamber and back to said one end at least once before directing the flow of water to said outlet.

5. Apparatus as claimed in claim 1 wherein said outer chamber is provided with removable end caps which also form mounting means for said inner chamber.

6. Apparatus as claimed in claim 1 including magnetic field generating means arranged to generate a magnetic field, and means to direct the flow of water in said apparatus through said magnetic field.

7. Apparatus as claimed in claim 6 wherein said magnetic field generating means comprise at least one pair of permanent magnets.

8. Apparatus as claimed in claim 6 wherein said magnetic field generating means comprise two pairs of permanent magnets, each pair being located on either side of a water conducting conduit, one of said pairs of magnets being arranged to attract one another and the other pair to repel one another.

* * * * *